United States Patent
Pickl et al.

(10) Patent No.: US 10,648,882 B2
(45) Date of Patent: May 12, 2020

(54) WIND TUNNEL WAKE GENERATOR

(71) Applicant: Government of the United States, as represented by the Secretary of the Air Force, Wright-Patterson AFB, OH (US)

(72) Inventors: Carl Pickl, New Carlisle, OH (US); James L. Rutledge, Fairborn, OH (US); Marc D. Polanka, Huber Heights, OH (US); Brian Crabtree, Beavercreek, OH (US); Christopher Harkless, Vandalia, OH (US)

( * ) Notice: Subject to any disclaimer, the term of this patent is extended or adjusted under 35 U.S.C. 154(b) by 278 days.

(21) Appl. No.: 15/884,865

(22) Filed: Jan. 31, 2018

(65) Prior Publication Data
US 2019/0234830 A1    Aug. 1, 2019

(51) Int. Cl.
*G01M 9/06* (2006.01)
*G01M 9/04* (2006.01)
*F01D 17/08* (2006.01)

(52) U.S. Cl.
CPC .............. *G01M 9/065* (2013.01); *G01M 9/04* (2013.01); *F01D 17/08* (2013.01)

(58) Field of Classification Search
CPC .......... G01M 9/065; G01M 9/04; G01M 9/00; G01M 9/02; G01M 9/06; G01M 9/062; G01M 9/067; G01M 9/08; F01D 17/08; F15D 1/0005; B01F 2005/0025; B01F 2215/0037; F03D 1/04; F03D 1/0675; F03D 7/048; F03D 7/0204; F03D 17/00; F03D 3/0409; F03D 3/005; F03D 3/0454; F03D 9/25; F03D 9/002; B63B 1/32; B64C 21/00; B64C 23/06; G05D 15/02; B62D 35/001; F05B 2240/2212; F05B 2240/13; F05B 2250/71
See application file for complete search history.

(56) References Cited

U.S. PATENT DOCUMENTS 1,710,135 A    4/1922  Zahm
2,448,528 A    9/1948  Heuver
(Continued)

OTHER PUBLICATIONS

Bastankhah et al., "A wind-tunnel investigation of wind-turbine wakes in yawed conditions," Journal of Physics: Conference Series, vol. 625, Issue 1, Jun. 2015.
(Continued)

*Primary Examiner* — Lisa M Caputo
*Assistant Examiner* — Nigel H Plumb
(74) *Attorney, Agent, or Firm* — Timothy M. Barlow (57) ABSTRACT

A wake generator for placement in a wind tunnel between a wind source and a test object includes a first frame member having a first track formed thereon, where the first track has a shape including a first side that is substantially rounded and a second side that is substantially flat. The wake generator may include a mounting plate disposed within a perimeter of the first track, where the mounting plate is rotatable relative to the first frame member about a first axis. The wake generator may allow for better simulation of unsteady turbine wakes that influence cooling flow. The wake generator may also include a plurality of bars slidably engaged to the mounting plate and structurally configured to traverse along the first track when the mounting plate is rotated about the first axis.

6 Claims, 8 Drawing Sheets

(56) References Cited

U.S. PATENT DOCUMENTS

| | | | |
|---|---|---|---|
| 4,475,385 A | 10/1984 | Farmer | |
| 7,258,527 B2* | 8/2007 | Shih | B63H 7/00 415/4.2 |
| 8,591,170 B1* | 11/2013 | Rawls | F03D 3/002 415/4.2 |
| 8,829,704 B2* | 9/2014 | Grigg | F03D 3/002 290/54 |
| 9,068,557 B1* | 6/2015 | Garrett | F03D 3/0427 |
| 9,284,946 B2* | 3/2016 | Lane | F03D 3/067 |
| 9,346,535 B1 | 5/2016 | Adams | |
| 10,118,696 B1* | 11/2018 | Hoffberg | B64C 39/001 |
| 2011/0229322 A1* | 9/2011 | Tadayon | F03D 1/065 416/91 |
| 2013/0129509 A1* | 5/2013 | Manning | F03D 3/068 416/17 |
| 2014/0314555 A1* | 10/2014 | Welch | F03D 7/06 415/185 |
| 2017/0138345 A1* | 5/2017 | Bahnmuller | F03D 7/06 |
| 2018/0266390 A1* | 9/2018 | Westergaard | F03D 3/0427 |

OTHER PUBLICATIONS

Bons et al., "The Application of Flow Control to an Aft-Loaded Low Pressure Turbine Cascade With Unsteady Wakes," Journal of Turbomachinery, vol. 134, May 2012.

Brandon et al., "Application of Wind Tunnel Free-Flight Technique for Wake Vortex Encounters," NASA Technical Paper 3672, Nov. 1997.

Chakka et al., "Modeling Unsteady Boundary Layer Transition on a Curved Plate Under Periodic Unsteady Flow Conditions: Aerodynamic and Heat Transfer Investigations," Transactions of the ASME, vol. 121, Jan. 1999.

NASA, "Characteristics of Six Research Wind Tunnels," Ames Aeronautical Laboratory, Apr. 26, 1994.

Foreman, Christopher Michael, "Characterization and Verification of a Closed Loop Wind Tunnel With a Linear Cascade and Upstream Wake Generator," Master's Thesis, Louisiana State University, May 2013.

Demetriades, Anthony, "The Compressible Laminar Two-Dimensional Wake with Arbitrary Initial Asymmetry," SWT Report No. 81-3, Air Force Office of Scientific Research, Jul. 1981.

Doorly et al., "Simulation of Wake Passing in a Stationary Turbine Rotor Cascade," Jet Propulsion, vol. 1, No. 4, Jan. 1985.

Larwood, S., "Wind Turbine Wake Measurements in the Operating Region of a Tail Vane," 39th American Institute of Aeronautics and Astronautics, Inc. (AIAA) Aerospace Sciences Meeting, Reno, Nevada, Jan. 8-11, 2001.

Lewellen et al., "Turbulent Wakes in a Stratified Fluid, Part 1: Model Development, Verification, and Sensitivity to Initial conditions," Office of Naval Research, Aug. 1974.

Welsh, Andrew, "Low Turbulence Wind Tunnel Design and Wind Turbine Wake Characterization," Theses, University of Wisconsin Milwaukee, May 2013.

Murawski et al., "Effect of Wake Disturbance Frequency on the Secondary Flow Vortex Structure in a Turbine Blade Cascade," Transactions of the ASME, vol. 122, Sep. 2000.

Baiense et al., "Design of a Moving Bar Wake Generator for a Linear Compressor Cascade," Major Qualifying Project Report, Worcester Polytechnic Institute, Apr. 26, 2012.

Sarkar et al., "Large Eddy Simulation on the Interactions of Wake and Film-Cooling Near a Leading Edge," Journal of Turbomachinery, vol. 137, Jan. 2015.

Schobeiri et al., "Experimental study on the effect of unsteadiness on boundary layer development on a linear turbine cascade," Experiments in Fluids 23, pp. 306-316, Feb. 1997.

Swanson, Jr., et al., "Turbulent Wake Behind Slender Bodies Including Self-Propelled Configurations," Office of Naval Research, Sep. 1974.

Womack et al., "Measurements in Film Cooling Flows With Periodic Wakes," Journal of Turbomachinery, vol. 130, Oct. 2008.

\* cited by examiner

WIND TUNNEL WAKE GENERATOR

STATEMENT OF GOVERNMENT INTEREST

The invention described herein may be manufactured, used, and licensed by or for the Government of the United States for all governmental purposes without the payment of any royalty.

BACKGROUND

Wake generators may be used in gas turbine research, e.g., to provide unsteady wakes representative of blade passage wakes or other wakes that may be experienced while a turbine is in use. These wakes may have an effect on the flow around turbine components, and, as such, high fidelity research aimed at evaluating unsteady effects on turbines should account for wake passage. For example, wakes can cause a fluctuating pressure distribution on turbine blades or vanes, influencing the aerodynamic qualities and the behavior of film cooling flows. As the desire grows for higher fidelity engine representative conditions that include unsteady flow effects, it is expected that more experimentalists begin incorporating wake generators into their testing facilities.

Wake generators can have cylindrical rods or other wake-producing objects that traverse upstream of a test article in a wind tunnel. The rods intersect and disrupt air flow as they traverse across the width of the wind tunnel to produce an unsteady wake that traverses across the test article. By way of example, some of the wake generators used in research include: (i) a rotating bar wake generator; (ii) a "squirrel cage" wake generator; and (iii) a traversing wake generator. These current and past wake generators are generally limited to creating a wake in a linear or rotational fashion, and include various disadvantages, where some are discussed below.

Rotating bar wake generators can be inefficient in simulating a wake inside a turbine engine (e.g., causing only a full wake at one point), can cause air leakage (e.g., if slots or the like need to be cut into the wind tunnel), can be cumbersome, and so on.

Squirrel cage wake generators may include cylindrical bars mounted axially between two parallel disks that are driven by a motor. Because of the circular path of the cylindrical bars, the velocity profiles do not precisely match those in turbine engines. Also, a secondary wake, sometimes referred to as a reverse wake, is produced when a cylinder is upstream of another cylinder, and absorbs the wake produced by the cylinder directly in front of the test piece.

Traversing wake generators may include cylindrical bars mounted on a rail where the bars pass upstream of the test article in a straight line. However, because the bars do not make a return trip to the starting point, these designs allow for only short duration testing dictated by the length of the bar cascade and the speed at which the bars translate. Also, because these designs generally involve large holes cut in a wind tunnel, air leakage can be a concern.

There remains a need for improved wind tunnel wake generators, e.g., to minimize reverse wakes and the effects thereof.

SUMMARY

In an implementation, a wake generator for placement in a wind tunnel between a wind source and a test object includes a first frame member having a first track formed thereon, where the first track has a shape including a first side that is substantially rounded and a second side that is substantially flat. The wake generator may include a mounting plate disposed within a perimeter of the first track, where the mounting plate is rotatable relative to the first frame member about a first axis. The wake generator may also include a plurality of bars slidably engaged to the mounting plate and structurally configured to traverse along the first track when the mounting plate is rotated about the first axis, where each of the plurality of bars includes a pivotal connection allowing each of the plurality of bars to pivot about the pivotal connection when traversing along the first track.

In a first variation of the wake generator, the shape of the first track may be structurally configured to mitigate a reverse wake created by the plurality of bars at the first side and to generate a predetermined wake by the plurality of bars at the second side.

In another variation of the wake generator, each of the plurality of bars may comprise at least one face that is substantially flat, and where each of the plurality of bars may be structurally configured to align the at least one face substantially parallel to the second side of the first track when disposed along the second side, and to align the at least one face at an angle relative to the second side of the first track when disposed along the first side.

In a further variation of the wake generator, the angle is substantially perpendicular to the second side of the first track when disposed along the first side.

In another variation of the wake generator, the first track is defined by a cutout on the first frame member.

In a further variation of the wake generator, the shape of the first track is substantially circular but for the second side being substantially flat.

In another variation, the wake generator further comprises one or more sliders affixed to the mounting plate between the mounting plate and the plurality of bars, where each of the plurality of bars is slidable along the one or more sliders to translate along the mounting plate relative to the first axis.

In a further variation, the wake generator further comprises a motor engaged with the mounting plate, the motor operable to rotate the mounting plate about the first axis.

In another variation, the wake generator further comprises a second frame member disposed opposite the first frame member with the plurality of bars disposed therebetween, the second frame member comprising a second track.

In a further variation of the wake generator, each of the plurality of bars comprises a bearing engaging the first frame member.

In another variation, the wake generator further comprises a bracket disposed between each of the plurality of bars and the mounting plate, the bracket structurally configured to engage the first track and to align each of the plurality of bars in predetermined positions throughout the first track when the mounting plate is rotated about the first axis.

In an implementation, a method for generating a wake in a wind tunnel includes aligning a wake generator in a wind tunnel between a wind source and a test object, with a first side of the wake generator facing the wind source and a second side of the wake generator facing the test object, and moving a plurality of bars of the wake generator in a predetermined pattern, where the predetermined pattern is selected to mitigate a reverse wake created by the plurality of bars at the first side of the wake generator and to generate a predetermined wake by the plurality of bars at the second side of the wake generator. The method may also include pivoting each of the plurality of bars while moving in the predetermined pattern.

In a first variation, the method for generating a wake further comprises generating the predetermined wake through the moving and the pivoting of the plurality of bars.

In another variation, the method for generating a wake further comprises adjusting the predetermined wake.

In a further variation of the method for generating a wake, adjusting the predetermined wake comprises altering a speed of the plurality of bars moving in the predetermined pattern.

In another variation of the method for generating a wake, pivoting each of the plurality of bars comprises aligning each of the plurality of bars substantially parallel to a substantially flat shape of the predetermined pattern when disposed along the second side and aligning each of the plurality of bars at an angle relative to the substantially flat shape when disposed along the first side.

In a further variation, the method for generating a wake further comprises sliding the plurality of bars relative to a first axis when moving in the predetermined pattern.

In another variation, the method for generating a wake further comprises sensing a wake formed by the wake generator in the wind tunnel; comparing the wake to the predetermined wake; and adjusting the wake based on the comparison.

In an implementation, a wake-generating system includes a wake generator having a first frame member including a first track formed thereon, the first track having a shape including a first side that is substantially rounded and a second side that is substantially flat. The wake generator may also include a mounting plate disposed within a perimeter of the first track, the mounting plate rotatable relative to the first frame member about a first axis. The wake generator may further include a plurality of bars slidably engaged to the mounting plate and structurally configured to transverse along the first track when the mounting plate is rotated about the first axis, where each of the plurality of bars includes a pivotal connection allowing each of the plurality of bars to pivot about the pivotal connection when traversing along the first track. The system may also include a motor engaged with the mounting plate, the motor operable to rotate the mounting plate about the first axis, and a controller including a processor and a memory, where the processor is configured to control one or more of the motor, rotation of the plurality of bars, translation of the plurality of bars, and pivoting of the plurality of bars.

In a first variation, the wake-generating system further comprises a sensor downstream of the wake generator operable to measure a wake created by the wake generator.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

The various methods, systems, apparatuses, and devices described herein may generally provide for wind tunnel wake generators, e.g., wake generators configured to mitigate or otherwise minimize reverse wakes and their effects.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may include wake generators, and more specifically wake generators structurally configured to mitigate or eliminate reverse wakes and the effects created by these wakes in a wind tunnel or the like. As discussed above, wake generators of various types have been used in wind tunnels to produce flow unsteadiness, e.g., similar to that found downstream of a rotating turbine cascade. That is, for some wind tunnel testing, it is advantageous to study the effects of unsteady wakes traversing across a test object. Thus, the present teachings may be used for the study of wakes on turbines (e.g., gas turbines) and the like. For example, gas turbine engine manufacturers that test turbine components in wind tunnels may use the present teachings to allow for better simulation of unsteady turbine wakes that influence cooling flow. However, it will be understood that wake generators described herein may also or instead be used for other purposes, such as testing the performance of other articles in a wind tunnel that may experience wakes or other disturbances in the flow of fluid (e.g., air) including vehicles and otherwise. As such, wake generators described herein may be used in a wind tunnel or another testing facility where the flow of a fluid over or through an article is tested. For example, wake generators described herein may be used in aeronautical wind tunnels, automotive tunnels, aeroacoustic tunnels, aquadynamic flumes, fan testing facilities, wind engineering testing facilities, liquid movement testing facilities, and so on. Thus, the term "wind tunnel" as used herein shall include any and all of the aforementioned testing facilities and the like, unless explicitly stated to the contrary or otherwise clear from the context.

As discussed above, current wake generators are generally limited to one motion—either rotational or translational motion. Wake generators that include wake-producing objects that move in a linear motion may not create secondary wakes, but can sacrifice the integrity of the wind tunnel. Wake generators that include wake-producing objects that move wake-producing objects in a circular path may produce secondary wakes and thus an undesirable flow. The present teachings, however, may include wake generators that fit wake-producing objects inside a wind tunnel and mitigate secondary wakes or the effects thereof on a test object, thereby having the advantages provided by both linear and rotational motion systems. In a wake generator according to the present teachings, the wake-producing objects may be moved in a substantially circular path (or other curved path) through most of the circuit, but in a substantially linear path when disposed adjacent to the test article. This may ensure that primary wakes are of uniform intensity as they traverse across the test article. Also, in a wake generator according to the present teachings, wake-producing objects may have a substantially flat face (instead of a cylindrical bar) such that predetermined wakes can be created when the flat face is aligned substantially perpendicular to a direction of the wind. To this end, in a wake generator according to the present teachings, a secondary rotation of the wake-producing objects may allow for the use of such wake-producing objects having a substantially flat face, so that the secondary wakes can be minimized through a 90-degree rotation of the wake-producing objects to be in-line with the direction of fluid flow during a reverse trip across the tunnel (i.e., the return pass). More specifically, if the cross-section of the wake-producing objects is selected to be an oblong shape, a thin panel, or the like, wakes moving in an undesirable direction may be minimized by pivoting the wake-producing objects, e.g., during their return pass through the wake generator. Thus, the present teachings may represent an improvement over designs that suffer from reverse wakes when wake-producing objects return to their starting position or otherwise to a position upstream within the wake generator.

Before describing wake generators according to the present teachings in more detail, a brief description of reverse wakes is provided below. In this disclosure, "reverse wakes" may also be described as "secondary wakes." These secondary wakes, as opposed to primary wakes, may be undesirable in a wind tunnel, and may thus be advantageously minimized or eliminated. In other words, in a wind tunnel, it may be desirous to create one or more primary wakes using wake-producing objects of a wake generator disposed between a wind source and a test object. A secondary wake (aka reverse wake) may be created when wake-producing objects travel in a circular, or otherwise connected, continuous path when wake-producing objects are disposed upstream of another wake-producing object, e.g., on a return pass.

Figure 1:
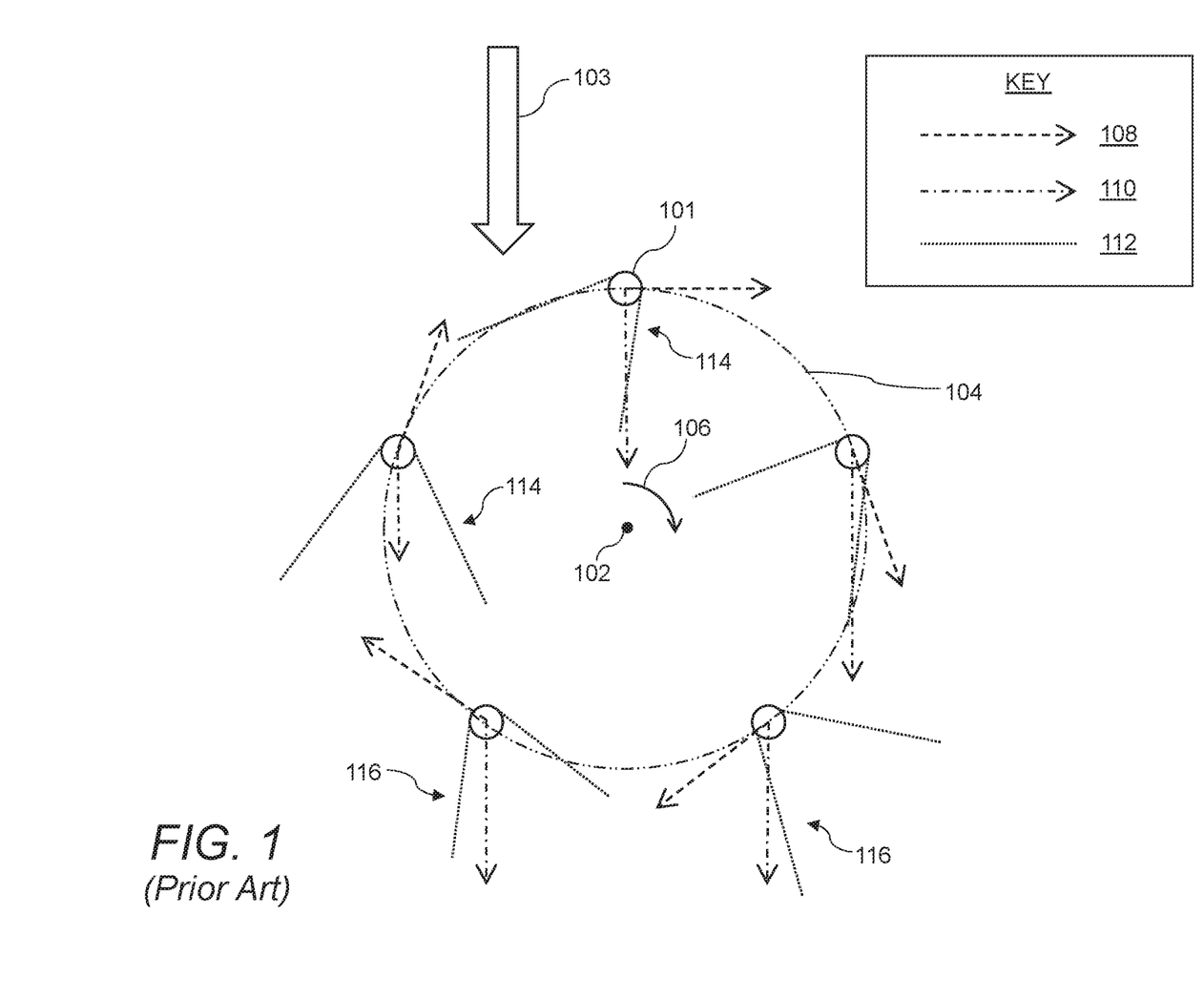
FIG. 1 illustrates velocity vectors and wake production for a prior art wake generator.

FIG. 1 illustrates velocity vectors and wake production for a prior art wake generator. Specifically, FIG. 1 illustrates velocity vectors and wake production for a squirrel cage wake generator having cylindrical bars 101 traversing in a circular path about an axis 102. FIG. 1 shows the air flow 103 in a wind tunnel, the path of motion 104 and the direction of motion 106 of the wake generator, object velocity vectors 108 for the wake-producing objects (i.e., the cylindrical bars 101), air flow velocity vectors 110, and estimated wakes 112 produced by the wake-producing objects. As shown in FIG. 1, one or more secondary wakes 114 are produced when a cylindrical bar 101 is upstream of another cylindrical bar 101, which can disrupt primary wakes 116 produced by a cylindrical bar 101 nearest the test object.

Figure 2:
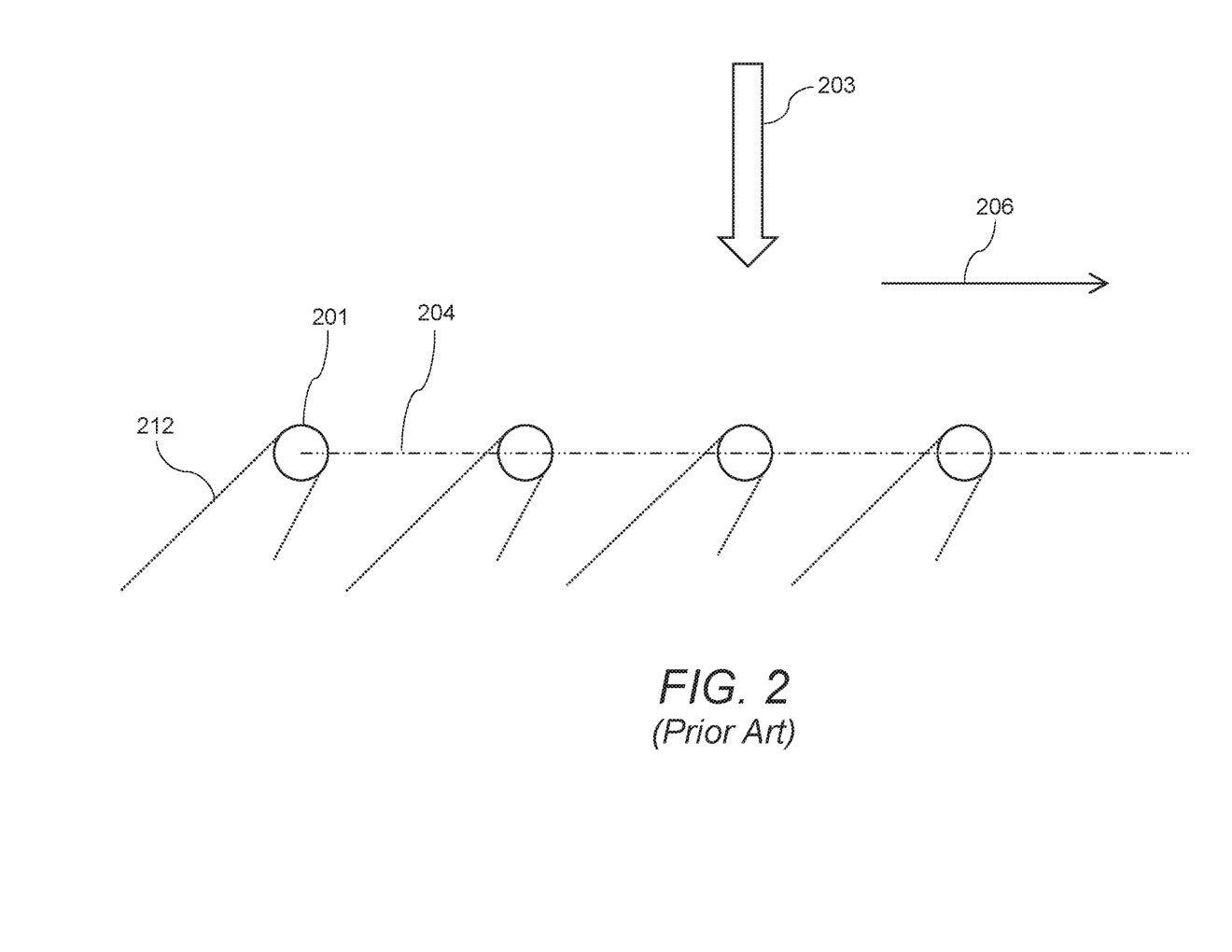
FIG. 2 illustrates wake production for a prior art wake generator.

FIG. 2 illustrates wake production for a prior art wake generator. Specifically, FIG. 2 illustrates wake production for a traversing wake generator including wake-producing objects 201 traversing in a linear path. FIG. 2 shows the air flow 203 in a wind tunnel, the path of motion 204 and the direction of motion 206 of the wake-producing objects 201, and the estimated wakes 212 produced by the wake-producing objects 201. As shown in FIG. 2, although no reverse wakes may be created, the wake-producing objects 201 do not make a "round-trip" thereby limiting tests to relatively short durations of time.

The present teachings may include a wake generator that provides the benefits of both a squirrel cage wake generator (e.g., through the inclusion of having a continuous path of motion) and a traversing wake generator (e.g., through the inclusion of linear motion near the test article).

Figure 3:
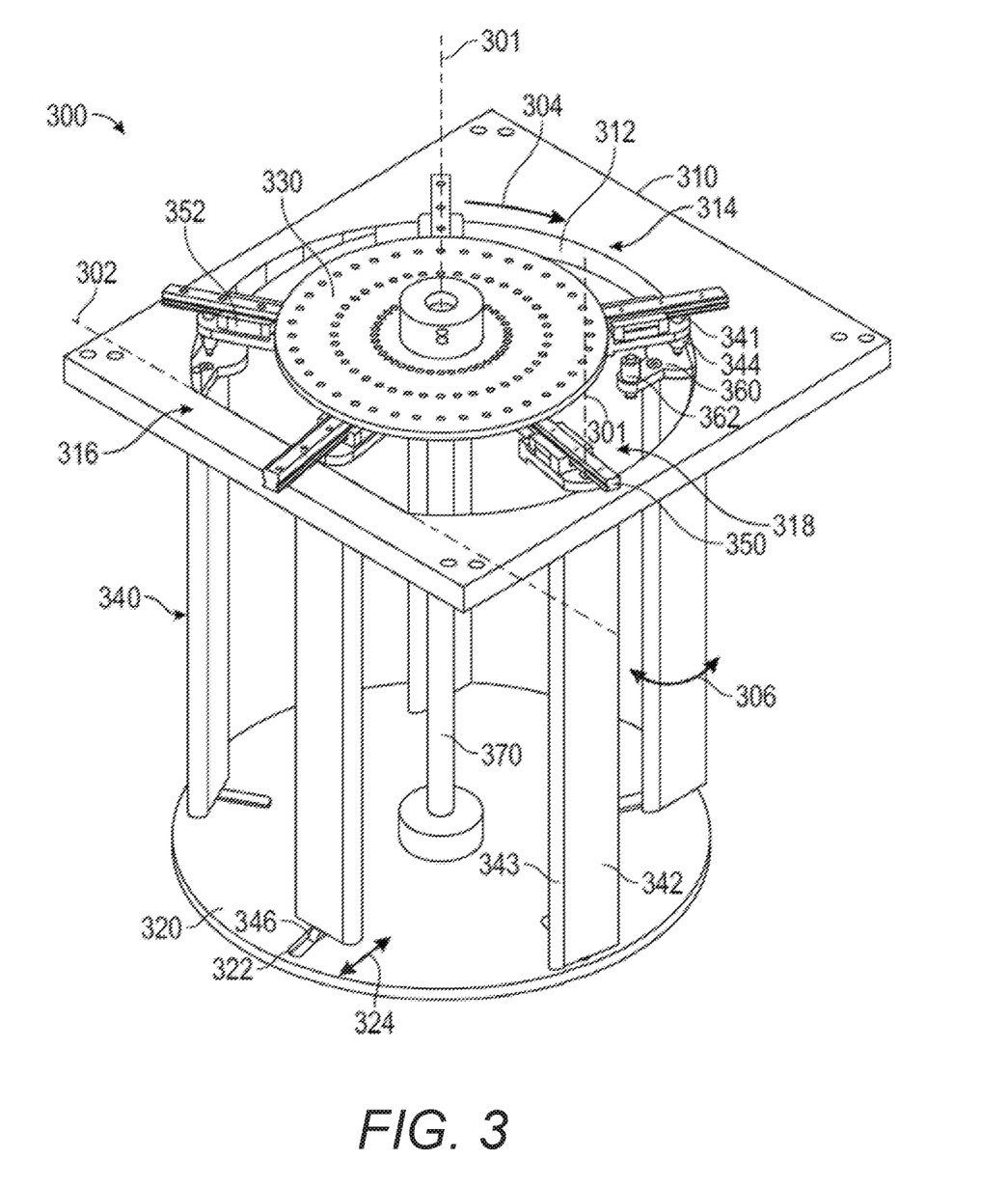
FIG. 3 illustrates a wake generator, in accordance with a representative embodiment.

FIG. 3 illustrates a wake generator, in accordance with a representative embodiment. The wake generator 300 may be structurally configured for placement in a wind tunnel between a wind source and a test object. The wake generator 300 may also be structurally configured to minimize, mitigate, or eliminate the creation or effects of reverse wakes on a test object in a wind tunnel. The wake generator 300 may include one or more frame members (e.g., a first frame member 310 and a second frame member 320), a mounting plate 330 rotatable about a first axis 301, and a plurality of wake-producing objects (e.g., the bars 340 shown in FIG. 3).

The first frame member 310 may include a first track 312 formed thereon, where the bars 340 are structurally configured to traverse about the first track 312 when the wake generator 300 is in operation. In general, the shape of the first track 312 may be structurally configured to mitigate a reverse wake created by the bars 340 at the first side 314 and to generate a predetermined wake by the bars 340 at the second side 316. For example, the first track 312 may have a shape that includes a first side 314 that is substantially rounded and a second side 316 that is substantially flat, i.e., including a substantially flat portion as depicted in FIG. 3. It will be understood that the first side 314 being "substantially rounded" in this context may include a first side 314 that is circular, oval, elliptical, or otherwise curved, where these curved shapes can include a deviation from such shapes, e.g., because of manufacturing tolerances and the like. "Substantially rounded" in this context may also or instead include an overall non-linear shape, such as a plurality of curves adjoining one another, or a plurality of linear segments that join together at angles to form an overall non-linear shape, such as a polygonal shape having chamfered or curved corners. It will also be understood that the second side 316 being "substantially flat" in this context may include a second side 316 that includes a linear path, or a near linear path only deviating from linearity because of manufacturing tolerances and the like. "Substantially flat" in this context may also or instead include an overall shape that is aligned for a majority of its length along a second axis 302. The second axis 302 may be orthogonal to a direction of the fluid flow in a wind tunnel.

Thus, in certain implementations, for example as shown in FIG. 3, the shape of the first track 312 may be substantially circular but for the second side 316 being substantially flat, i.e., the second side 316 including a substantially flat portion as depicted in FIG. 3. Other shapes are also or instead possible. In general, the first side 314 of the first track 312 may be disposed closer to a wind source within a wind tunnel than the second side 316 during operation of the wake generator 300, and the second side 316 of the first track 312 may be disposed closer to a test article within a wind tunnel than the first side 314 during operation of the wake generator 300.

The first track 312 may be defined by a cutout 318 on the first frame member 310. The cutout 318 may include a groove or channel formed in the first frame member 310, an entire section (e.g., central portion) that is removed from the first frame member 310 as shown in FIG. 3, or combinations thereof.

The mounting plate 330 may be disposed within a perimeter of the first track 312, where the mounting plate 330 is rotatable relative to the first frame member 310 about the first axis 301. In general, the bars 340 may be engaged to the mounting plate 330 such that rotation of the mounting plate 330 also moves the bars 340 about the shape of the first track 312. For example, the plurality of bars 340 may be slidably engaged to the mounting plate 330 and structurally configured to traverse along the first track 312 when the mounting plate 330 is rotated about the first axis 301. One or more of the plurality of bars 340, e.g., each of the plurality of bars 340, may include a pivotal connection 341 (e.g., to the mounting plate 330 or to a component engaged with the mounting plate 330) allowing the bars 340 to pivot about the pivotal connection 341 (which may also be disposed along the direction of the first axis 301 as shown in FIG. 3, such that the bars 340 pivot about the first axis 301 while simultaneously traversing in a path around the first axis 301) when traversing along the first track 312. An example of the movement of the bars 340 along the first track 312 is provided by the first arrow 304, and an example of the pivoting of the bars 340 is provided by the second arrows 306.

The bars 340 may be the wake-producing objects in the wake generator 300. To this end, the bars 340 may be rotated around the first track 312, i.e., from the first side 314 to the second side 316, e.g., in a continuous manner during operation of the wake generator 300. The bars 340 may each include the same shape (or similar shapes), or the bars 340 may be different from one another. It will be understood that the terms "wake-producing objects" (and the like) and "bars" may be used interchangeably throughout this disclosure, and that the discussion of one shall include the other unless explicitly stated to the contrary. Thus, although FIG. 3 shows wake-producing objects shaped as bars 340 or plates, other shapes are also or instead possible. In fact, many objects capable of producing wakes may be used in the wake generator 300 described herein, and the wake generator 300 can similarly be adapted for different shapes of wake-producing objects without departing from the present teachings.

In certain implementations, each of the plurality of bars 340 includes a face 342 that is substantially flat (e.g., a face 342 having an overall shape that is aligned for a majority of its width along a single axis). In this manner, the face 342 may be substantially planar, e.g., where a majority of the surface of the face 342 is aligned along a single plane. For example, each of the plurality of bars 340 may include one or more of (i) a substantially oblong cross-sectional shape and (ii) a substantially rectangular cross-sectional shape. However shaped, as described above, each of the bars 340 may include at least one face 342 that is substantially flat, where each of the bars 340 is structurally configured to align the face 342 substantially parallel to the second side 316 of the first track 312 (e.g., within ten degrees of the second axis 302) when disposed along the second side 316, and to align the face 342 at an angle relative to the second side 316 of the first track 312 (and more specifically, relative to the second axis 302) when disposed along the first side 314. For example, the face 342 may be aligned at about a 90-degree angle relative to the second side 316 of the first track 312 when disposed along the first side 314. In other words, the angle of the face 342 may be substantially perpendicular to the second side 316 of the first track 312 when disposed along the first side 314 of the first track 312. In this manner, while traversing around the first track 312, the bars 340 may pivot relative to the first track 312 such that the face 342 creates a predetermined wake at the first side 314 of the first track 312 that is smaller than a predetermined wake created by the face 342 at the second side 316 of the first track 312. The predetermined wake at the first side 314 of the first track 312 may be the secondary wake, which may be mitigated by an oblong-shaped bar 340 pivoting when on the first side 314 such that its narrow ends 343 face the fluid direction in the wind tunnel (as depicted on the first side 314 in FIG. 3), and its face 342 is substantially aligned parallel with the fluid direction in the wind tunnel (as depicted on the second side 316 in FIG. 3). In this context, it will be understood that being substantially aligned parallel to the wind direction shall mean that a plane intersecting a majority of the face 342 of the oblong-shaped bar 340 is within about 20 degrees of a vector representing the general direction of the wind. The predetermined wake at the second side 316 of the first track 312 may be the primary wake, which may be maximized or otherwise created in a desired manner by an oblong-shaped bar 340 pivoting when on the second side 316 such that its face 342 is disposed at a predetermined angle relative to the fluid direction in the wind tunnel, e.g., where the face 342 is aligned such that the fluid direction is normal to the face 342 when on the second side 316.

As discussed above, and as shown in FIG. 3, the wake generator 300 may include a second frame member 320 disposed opposite the first frame member 310 with the plurality of bars 340 disposed therebetween. The second frame member 320 may include a second track 322 (or a plurality of second tracks 322 or slots as shown in FIG. 3). Each of the plurality of bars 340 may be structurally configured to traverse along the second track 322 while also traversing along the first track 312 when the mounting plate 330 is rotated about the first axis 301. The second track 322, or the plurality of second tracks 322 as shown in FIG. 3, may define a path for the sliding motion of the bars 340, i.e., the bars 340 sliding toward and away from the first axis 301 in the direction indicated by the third arrows 324. The second track 322 may also or instead include a shape that is the same or similar to the shape of the first track 312 (not shown in FIG. 3, but shown in FIG. 4), such that the bars 340 traverse around both the first track 312 and the second track 322 when the mounting plate 330 is rotated about the first axis 301.

The wake generator 300 may also include one or more sliders 350 affixed to the mounting plate 330, e.g., between the mounting plate 330 and each of the plurality of bars 340. The sliders 350 may provide for a sliding motion of the bars 340 relative to the mounting plate 330. In other words, and as discussed herein, each of the plurality of bars 340 may be slidable along the sliders 350 to translate along the mounting plate 330 relative to the first axis 301, i.e., toward and away from the first axis 301. The sliding motion of the bars 340 may be used so that the bars 340 can follow the shape of the first track 312, e.g., because the shape of the first track 312 may include a perimeter that is not equidistant from the first axis 301. Thus, the first bars 340 may translate relative to the first axis 301 in order to follow the path of the first track 312.

In certain implementations, one or more of the sliders 350 may include a linear rail. In this manner, the wake generator 300 may further include a carriage 352 that is slidable along the linear rail, where the carriage 352 is engaged with at least one of the plurality of bars 340.

The wake generator 300 may also include a plurality of bearings or the like to enable relative motion of one or more of its components. For example, each of the plurality of bars 340 may include a first bearing 344 engaging the first frame member 310. The first bearing 344 may include one or more of a roller bearing, a ball bearing, and the like. Each of the plurality of bars 340 may also or instead include a second bearing 346 engaged with the second frame member 320, which may be disposed opposite the first frame member 310 as described above. Similar to the first bearing 344, the second bearing 346 may include one or more of a roller bearing, a ball bearing, and the like.

The wake generator 300 may further include a bracket 360 disposed between each of the plurality of bars 340 and the mounting plate 330. The bracket 360 may be structurally configured to engage the first track 312 and to align each of the plurality of bars 340 in predetermined orientations throughout the first track 312 when the mounting plate 330 is rotated about the first axis 301, e.g., via pivoting of the bars 340. In this manner, the bracket 360 may provide mechanical limits or stops to pivotal motion of the bars 340 when traversing along the first track 312. To this end, the bracket 360 may include one or more orientation pins 362 that engage the first track 312 and one or more channels in the first frame member 310. One or more of the orientation pins 362 may include roller bearing or the like.

As shown in FIG. 3, a drive shaft 370 may engage one or more components of wake generator 300 such as the mounting plate 330 and the second frame member 320. In other implementations, such as that shown in FIG. 4, the drive shaft 370 may not extend through the wake-creating portion of the wake generator 300, such that it does not interfere with predetermined wakes created by the wake generator 300. Thus, the drive shaft 370 may not extend to the second frame member 320 in certain embodiments of the wake generator 300.

Figure 4:
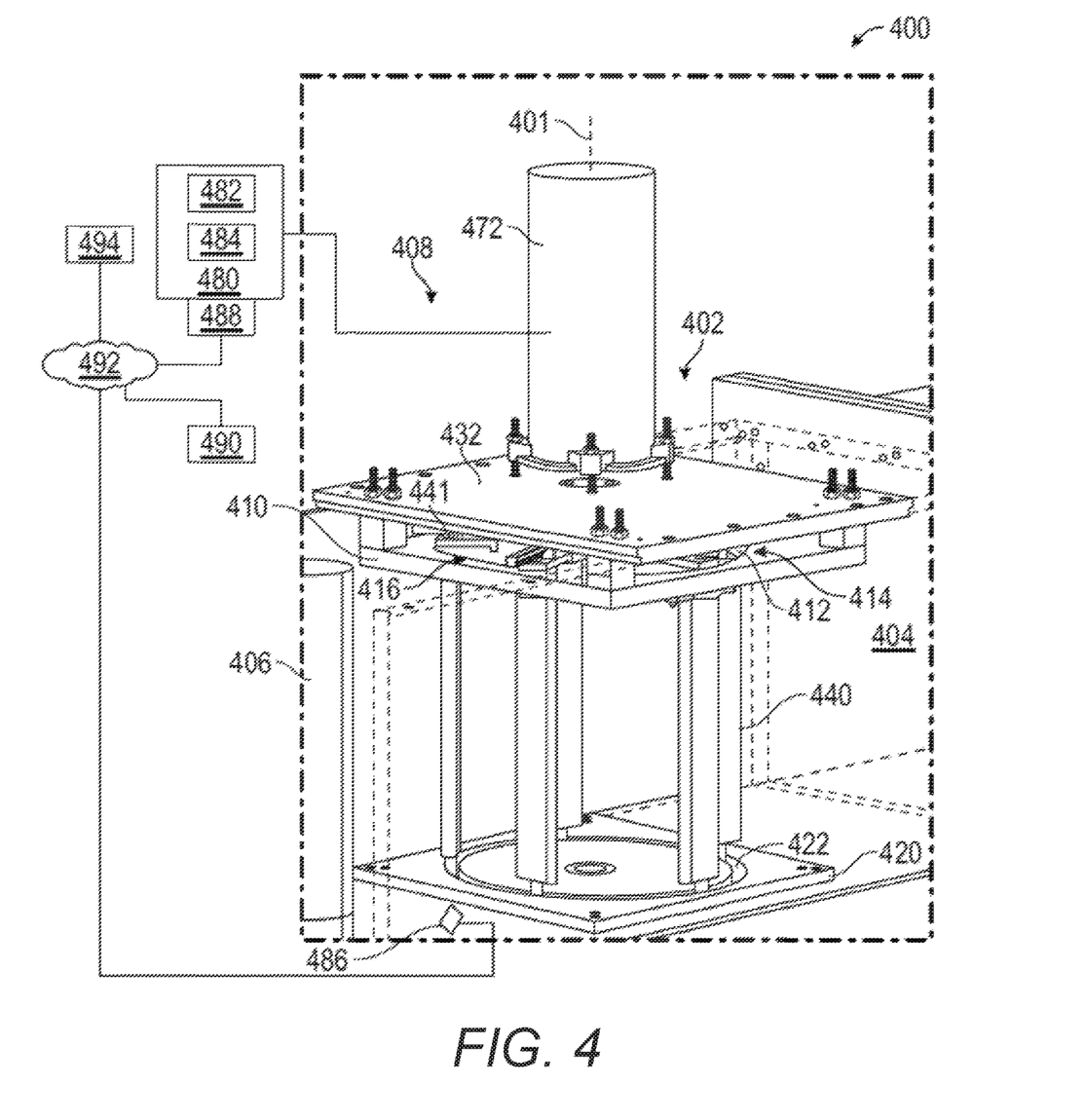
FIG. 4 illustrates a system for testing the effects of fluid on a test object, in accordance with a representative embodiment.

FIG. 4 illustrates a system for testing the effects of fluid on a test object, in accordance with a representative embodiment. The system 400 may include a wake generator 408, which may be the same or similar to the wake generator 300 described above with reference to FIG. 3, or it may be different. The system 400, or the wake generator 408 itself, may further include a motor 472, a controller 480, and one or more sensors 486. The system 400 may further be disposed in, or otherwise include, a wind tunnel 402 having a wind source 404 for testing the effects of a fluid moving over a test object 406.

The wind tunnel 402 shown in FIG. 4 may include any wind tunnel as described herein or otherwise known in the art. For example, the wind tunnel 402 may include a wind source 404 such as a fan, a blower, and the like, where the fluid moved by the wind source 404 is air or another gas. The fluid may also or instead be liquid. The test object 406 may include any item to be tested in a wind tunnel 402 as described herein, such as a turbine or a portion thereof, a vehicle or a portion thereof, and the like.

The wake generator 408 may be structurally configured to mitigate, minimize, or eliminate reverse wakes, or the effects thereof. To this end, the wake generator 408 may include a first frame member 410 having a first track 412 formed thereon. The first track 412 may have a shape that includes a first side 414 that is substantially rounded and a second side 416 that is substantially flat. Thus, it will be understood that the first side 414 may be distinguishable from the second side 416 according to the change in shape of the first track 412. As shown in FIG. 4, the first side 414 of the first track 412 may be disposed closer to the wind source 404 within the wind tunnel 402 than the second side 416 of the first track.

The wake generator 408 may also include a mounting plate (not visible in FIG. 4, but visible in FIGS. 5-7 described below) disposed within a perimeter of the first track 412, where the mounting plate is rotatable relative to the first frame member 410 about a first axis 401. The wake generator 408 may further include a plurality of bars 440, or other wake-producing objects, slidably engaged to the mounting plate and structurally configured to transverse along the first track 412 when the mounting plate is rotated about the first axis 401. Each of the plurality of bars 440 may include a pivotal connection 441 allowing each of the plurality of bars 440 to pivot about the pivotal connection 441 when traversing along the first track 412.

As explained above, the wake generator 408 may be similar to the wake generator 300 described above with reference to FIG. 3, but it may include a mounting frame 432 for the motor 472. The mounting frame 432 may be fixedly engaged with the first frame 410, where the motor 472 is mounted to the mounting frame 432. The mounting frame 432 may be spaced apart from the mounting plate to permit rotation thereof. The mounting frame 432 may include a metal plate (or other material) structurally configured distribute weight across the top of the wake generator 408 or wind tunnel 402. In some implementations, the mounting frame 432 is disposed on an exterior of the wind tunnel 402. The mounting frame 432 may instead be disposed within the wind tunnel 402. The first frame 410 and the mounting frame 432 may remain stationary in use, while the mounting plate rotates.

The wake generator 408 may include a second frame member 420, e.g., a second frame member 420 that is different from that shown in FIG. 3. For example, the second frame member 420 shown in FIG. 4 may include a second track 422 that is the same or similar to the first track 412, i.e., where the second track 422 includes the same shape, or a similar shape, as the first track 412. In some implementations, the second track 422 is profiled to match the path of the pivotal connection 441, where there may be a difference in the shape of the second track 422 relative to the first track 412, e.g., at a transition between the second side 416 and the first side 414.

The motor 472 may be engaged with the mounting plate (e.g., via a shaft coupler as explained below and shown in FIG. 7), where the motor 472 is operable to rotate the mounting plate about the first axis 401. The motor 472 may include a direct current (DC) motor. For example, the motor 472 may include a 90-volt, three-quarter horsepower, magnetic DC motor, having a maximum speed of about 1800 RPM.

The controller 480 may include a processor 482 and a memory 484, where the processor 482 is configured to control one or more of the motor 472, rotation of the plurality of bars 440, translation of the plurality of bars 440, pivoting of the plurality of bars 440, operation of the wind tunnel 402, and so on. The controller 480 may be in a communicating relationship with one or more sensors 486. For example, a sensor 486 may be disposed downstream of the wake generator 408, where the sensor 486 is operable to measure a wake created by the wake generator 408. In this manner, a signal from the sensor 486 to the controller 480 may cause the controller 480 to adjust a parameter of the wake generator 408 for adjusting the wake created by the wake generator 408. By way of example, the parameter may include altering a speed of the plurality of bars 440 moving about the first track 412.

The sensor 486 may include one or more of a flow sensor, a speed sensor, a chemical sensor, a gyroscopic sensor, a force sensor, an optical sensor, a pressure sensor, a thermal sensor, a proximity sensor, and so on. The sensor 486 may be located downstream of the wake generator 408 (e.g., to measure a wake created by the wake generator 408), on the wake generator 408, upstream of the wake generator 408, or elsewhere in the system 400. For example, the sensor 486 may be disposed on or near the wake generator 408 for measuring a rotational speed or other performance parameter thereof.

In general, and as discussed above, the controller 480 may control operation of one or more of the components of the system 400, e.g., the wind source 404, the test object 406, the wake generator 408 (or components thereof), and so on. The controller 480 may include, or otherwise be in communication with, the processor 482 and the memory 484. The controller 480 may be electronically coupled (e.g., wired or wirelessly) in a communicating relationship with one or more of the components of the system 400. Because the controller 480 may be operable to control the components of the system 400, the controller 480 may include any combination of software and/or processing circuitry suitable for controlling the various components of the system 400 described herein including without limitation processors 482, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 480 may include the processor 482 or other processing circuitry with sufficient computational power to provide related functions such as executing an operating system, providing a graphical user interface (e.g., to a display coupled to the controller 480 or another component of the system 400), set and provide rules and instructions for operation of the wake generator 408 or another component of the system 400, convert sensed information into positioning or other instructions, and operate a web server or otherwise host remote operators and/or activity through the communications interface 488 such as that described below. In certain implementations, the controller 480 may include a printed circuit board, an Arduino controller or similar, a Raspberry Pi controller or the like, a prototyping board, or other computer related components.

The controller 480 may be a local controller disposed on the wake generator 408, or a remote controller otherwise in communication with the wake generator 408 and its components. For example, one or more of the controller 480 and a user interface in communication with the controller 480 may be disposed on an external component (e.g., a computing device 490) in communication with the wake generator 408 over a data network 492.

The processor 482 of the controller 480 may include an onboard processor for the wake generator 408. The processor 482 may also or instead be disposed on a separate computing device 490 that is connected to the wake generator 408 through a data network 492, e.g., using the communications interface 488, which may include a Wi-Fi transmitter and receiver. The processor 482 may perform calculations for positioning of the wake generator 408 and its components.

The processor 482 may be any as described herein or otherwise known in the art. The processor 482 may be included on the controller 480, or it may be separate from the controller 480, e.g., it may be included on a computing device 490 in communication with the controller 480 or another component of the system 400. In an implementation, the processor 482 is included on or in communication with a server that hosts an application for operating and controlling the system 400.

The memory 484 may be any as described herein or otherwise known in the art. The memory 484 may contain computer code and may store data such as sequences of actuation or movement of the wake generator 408 and the like. The memory 484 may contain computer executable code stored thereon that provides instructions for the processor 482 for implementation. The memory 484 may include a non-transitory computer readable medium.

The system 400 may include a computing device 490 in communication with one or more of the components of the system 400 including without limitation the controller 480. The computing device 490 may include any devices within the system 400 operated by operators or otherwise to manage, monitor, communicate with, or otherwise interact with other participants in the system 400. This may include desktop computers, laptop computers, network computers, tablets, smartphones, smart watches, PDAs, or any other device that can participate in the system 400 as contemplated herein. In an implementation, the computing device 490 (and a user interface thereof) is integral with another participant in the system 400.

The data network 492 may be any network(s) or internetwork(s) suitable for communicating data and control information among participants in the system 400. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 400. The data network 492 may include wired or wireless networks, or any combination thereof. One skilled in the art will also recognize that the participants shown the system 400 need not be connected by a data network 492, and thus can be configured to work in conjunction with other participants independent of the data network 492.

Communication over the data network 492, or other communication between components of the system 400 described herein, may be provided via one or more communications interfaces 488. The communications interface 488 may include, e.g., a Wi-Fi receiver and transmitter to allow the logic calculations to be performed on a separate computing device 490. This may include connections to smartphone applications and the like. More generally, the communications interface 488 may be suited such that any of the components of the system 400 can communicate with one another. Thus, the communications interface 488 may be present on one or more of the components of the system 400. The communications interface 488 may include, or be connected in a communicating relationship with, a network interface or the like. The communications interface 488 may include any combination of hardware and software suitable for coupling the components of the system 400 to a remote device (e.g., a computing device 490 such as a remote computer or the like) in a communicating relationship through a data network 492. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 480 may be configured to control participation by the components of the system 400 in any network to which the communications interface 488 is connected, such as by autonomously connecting to the data network 492 to retrieve status updates and the like.

The system 400 may include other hardware 494. In certain implementations, the other hardware 494 may include a camera or other sensors, e.g., a flow sensor, a position sensor, a pressure sensor, and the like. The other hardware 494 may also or instead include a power source. The other hardware 494 may also or instead include input devices such as a keyboard, a touchpad, a computer mouse, a switch, a dial, a button, and the like, and output devices such as a display, a speaker or other audio transducer, light emitting diodes or other lighting or display components, and the like. Other hardware 494 of system 400 may also or instead include a variety of cable connections and/or hardware adapters for connecting to, e.g., external computers, external hardware, external instrumentation or data acquisition systems, and the like.

Figure 5:
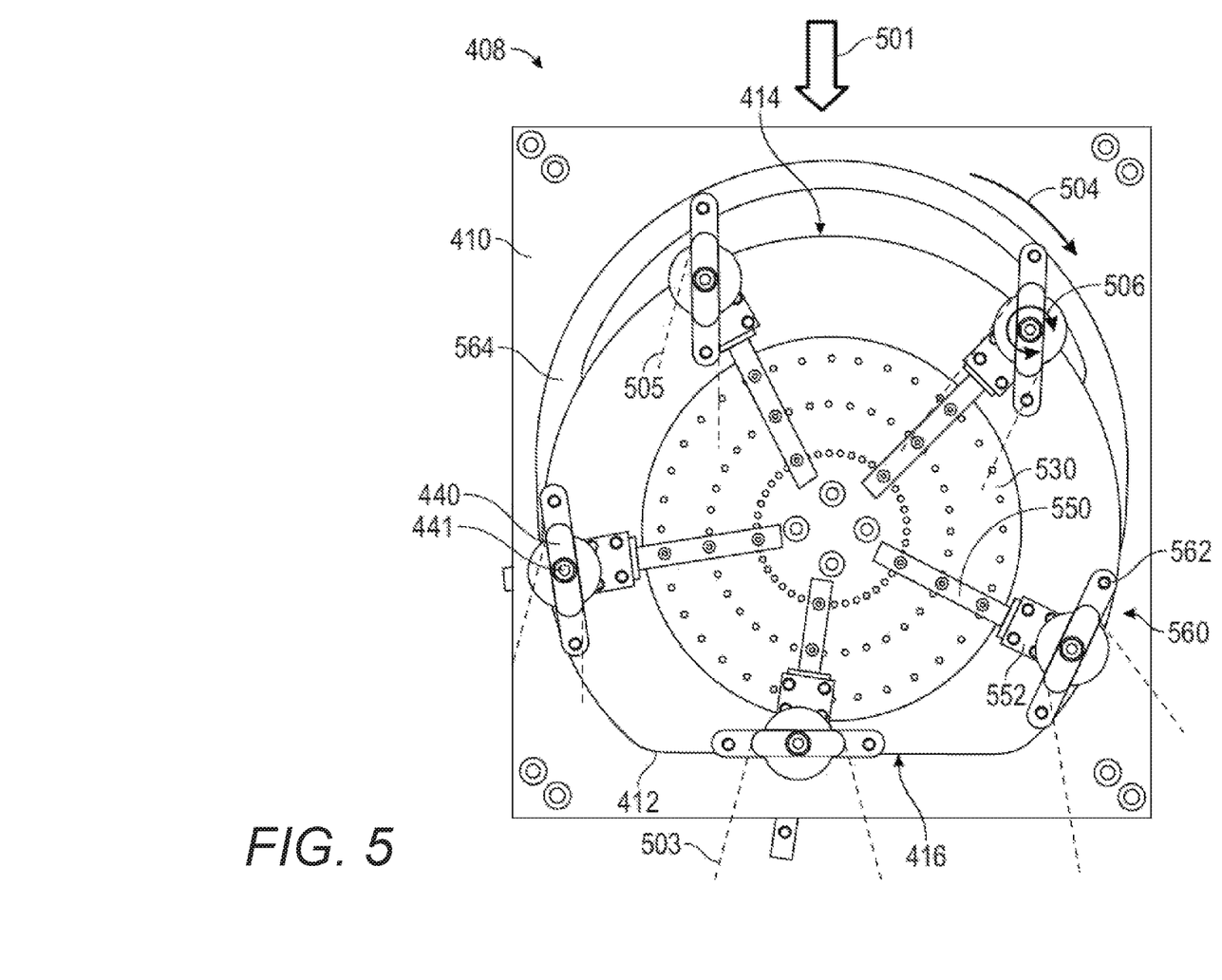
FIG. 5 illustrates a view of a top portion of a wake generator, in accordance with a representative embodiment.

FIG. 5 illustrates a view of a top portion of a wake generator, in accordance with a representative embodiment. Specifically, FIG. 5 shows a view from within the wake generator 408 of FIG. 4 looking upward. FIG. 5 clearly shows the first frame member 410, the first track 412 having a shape that includes the first side 414 that is substantially rounded and the second side 416 that is substantially flat, the mounting plate 530, and the wake-producing objects (e.g., the bars 440) having a pivotal connection 441. FIG. 5 also shows sliders 550, carriages 552, brackets 560, and orientation pins 562, which may be similar to those described above with reference to FIG. 3, as well as a channel 564 in the first frame member 410 to orient the bars 440.

FIG. 5 shows an example of the direction of airflow 501 in a wind tunnel, and wakes that are created by the bars 440 as they traverse around the first track 412 in the direction of the first arrow 504, and as the bars 440 pivot about the pivotal connection 441 in the direction of the second arrows 506 as they traverse around the first track 412. Specifically, primary wakes 503 and secondary wakes 505 are shown.

As shown in FIG. 5, the bars 440 may be moved in a substantially circular path through most of the circuit (i.e., the complete path around the first track 412), but in a substantially linear path when disposed near a test article, i.e., on the second side 416 of the first track 412. This may ensure that primary wakes 503 are of a desired, uniform intensity as they traverse across the test article. Also, secondary wakes 505 may be minimized by a 90-degree pivot of the bars 440 to be in-line with the airflow 501 during the reverse trip, i.e., when the bars 440 are disposed on the first side 414 of the first track 412.

FIG. 5 also shows how the bars 440 may slide toward and away from a center of the mounting plate 530, e.g., toward the center of the mounting plate 530 when disposed on the second side 416 of the first track 412 and away from the center of the mounting plate 530 when disposed on the first side 414 of the first track 412.

As shown in FIG. 5, the underside of the first frame member 410 may further include one or more channels 564. The channels 564 may form one or more pathways for cooperation with one or more of the orientation pins 562, where the pathways defined by the channels 564 work to pivot the bars 440 into predetermined orientations. For example, as shown in FIG. 5, a channel 564 may be disposed on the upstream portion of the first frame member 410 and may orient a bar 440 through cooperation with an orientation pin 562, into a position where a face of the bar 440 is substantially aligned with the direction of airflow 501. In this manner, the reverse wakes (secondary wakes 505), and the effects thereof on a test object downstream in a wind tunnel, may be mitigated.

Figure 6:
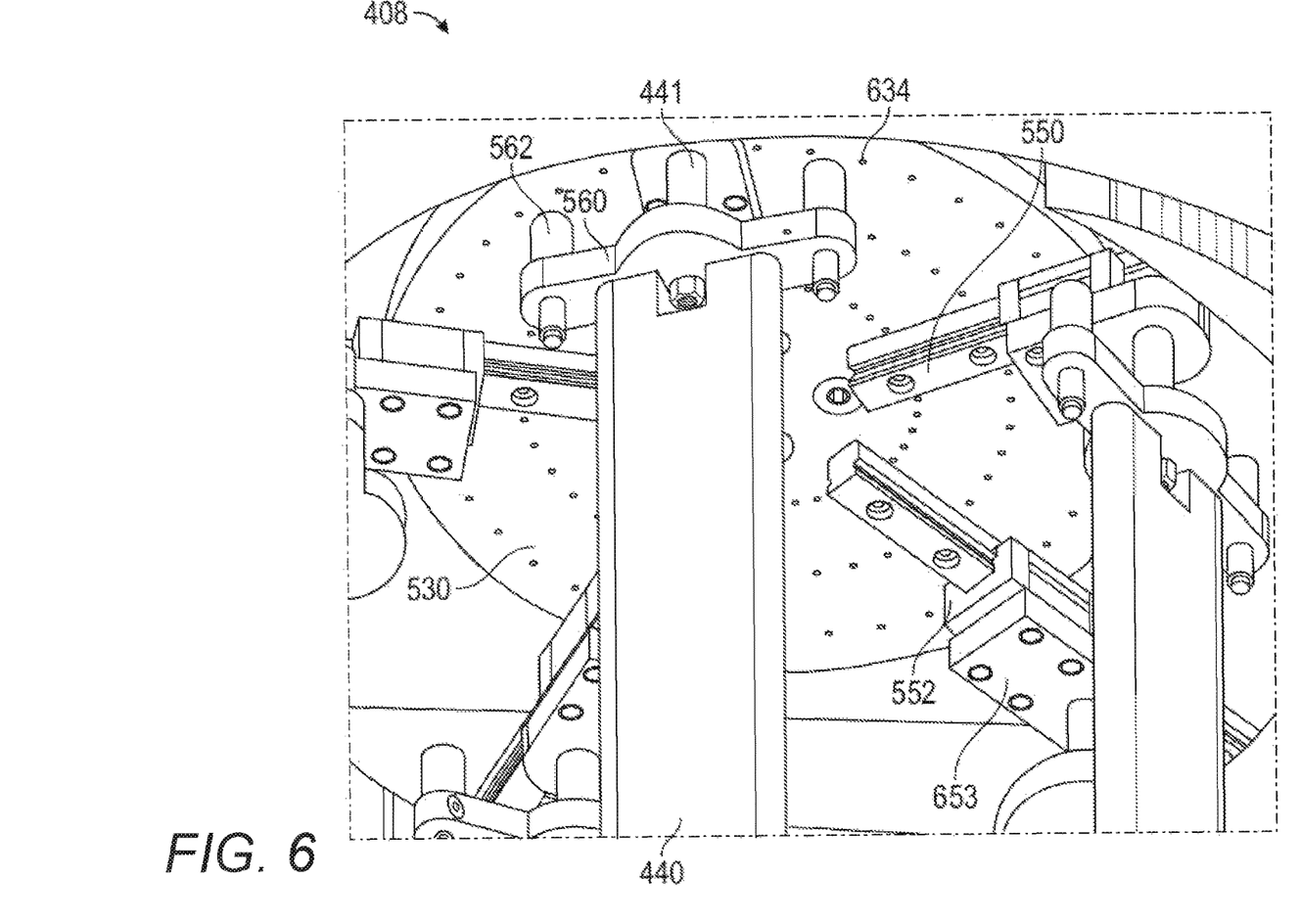
FIG. 6 illustrates a perspective view of a top portion of a wake generator, in accordance with a representative embodiment.

FIG. 6 illustrates a perspective view of a top portion of a wake generator, in accordance with a representative embodiment. Specifically, FIG. 6 shows a close-up view of the top of the wake generator 408 of FIGS. 4 and 5. FIG. 6 clearly shows the mounting plate 530 and the wake-producing objects (e.g., the bars 440) having a pivotal connection 441. FIG. 6 also shows the sliders 550, the carriages 552, the brackets 560, and the orientation pins 562.

As described herein, the brackets 560 may be disposed between each of the plurality of bars 440 and the mounting plate 530. The brackets 560 may include holes or other mounts for engagement with the orientation pins 562 and the pivotal connection 441 of the bars 440 to the mounting plate 530.

The pivotal connection 441 may include a shoulder bolt secured by a lock nut or the like. The orientation pins 562 may provide mechanical limits or stops for the pivotal motion of the bars 440 as described herein. The orientation pins 562 may include vented dowel rods, with set screws or the like that secure the position of each rod. One or more of the pivotal connection 441 and the orientation pins 562 may include roller bearings to allow for relatively smooth motion along the first track.

The sliders 550 may be affixed to the mounting plate 530 as shown in FIG. 6. The carriages 552, which are movable along the sliders 550 (e.g., passively movable), may be engaged with a plate 653 with a counterbore hole for the pivotal connection 441 (e.g., having a shoulder bolt as described above) to pass through. FIG. 6 also shows a close-up of the mounting plate 530, which may include a plurality of mounting holes 634, e.g., for mounting or reconfiguring of the sliders 550, the bars 440, a drive shaft, and so on.

Figure 7:
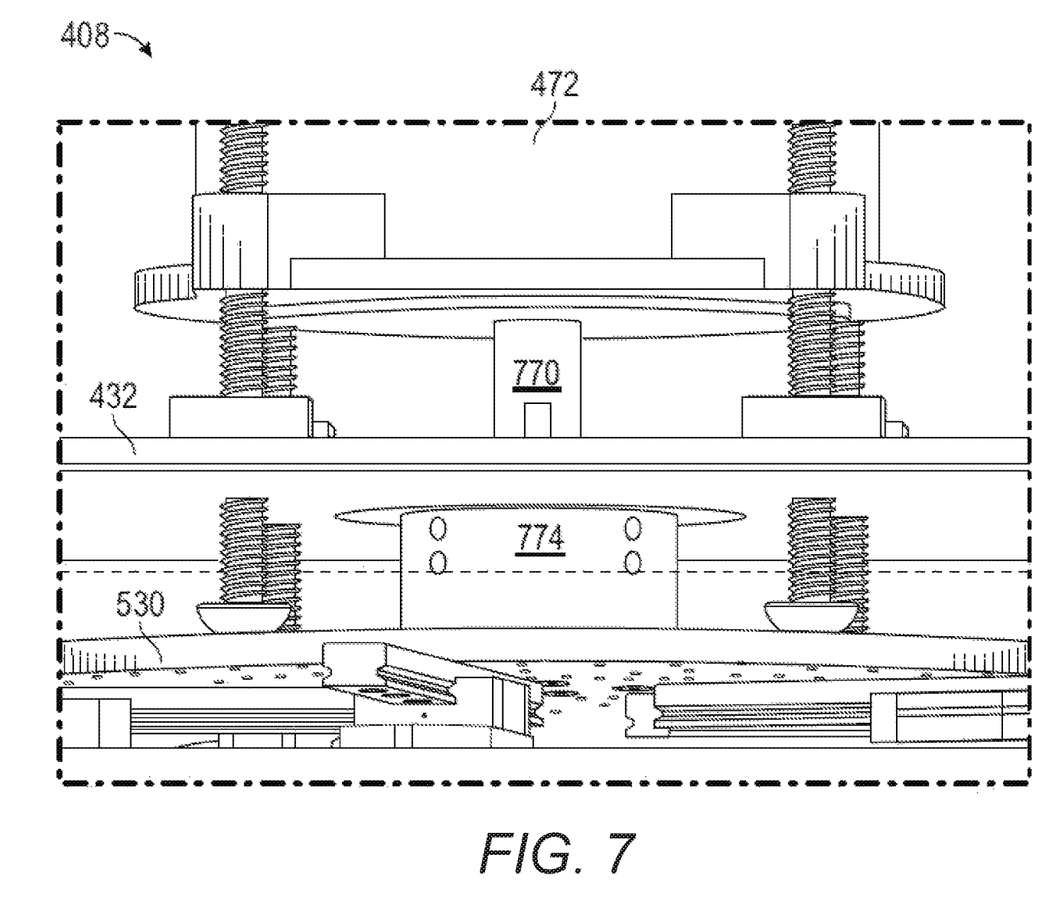
FIG. 7 illustrates a side view of a top portion of a wake generator, in accordance with a representative embodiment.

FIG. 7 illustrates a side view of a top portion of a wake generator, in accordance with a representative embodiment. Specifically, FIG. 7 shows a close-up view of the top of the wake generator 408 of FIGS. 4-6. FIG. 7 shows the mounting plate 530, the mounting frame 432, the motor 472, a drive shaft 770, and a shaft coupler 774.

As shown in FIG. 7, the shaft coupler 774 may engage the mounting plate 530 with the drive shaft 770 of the motor 472. In certain implementations, the motor 472 may be mounted at the top of the wind tunnel (e.g., external to the wind tunnel), but other configurations are also or instead possible.

Figure 8:
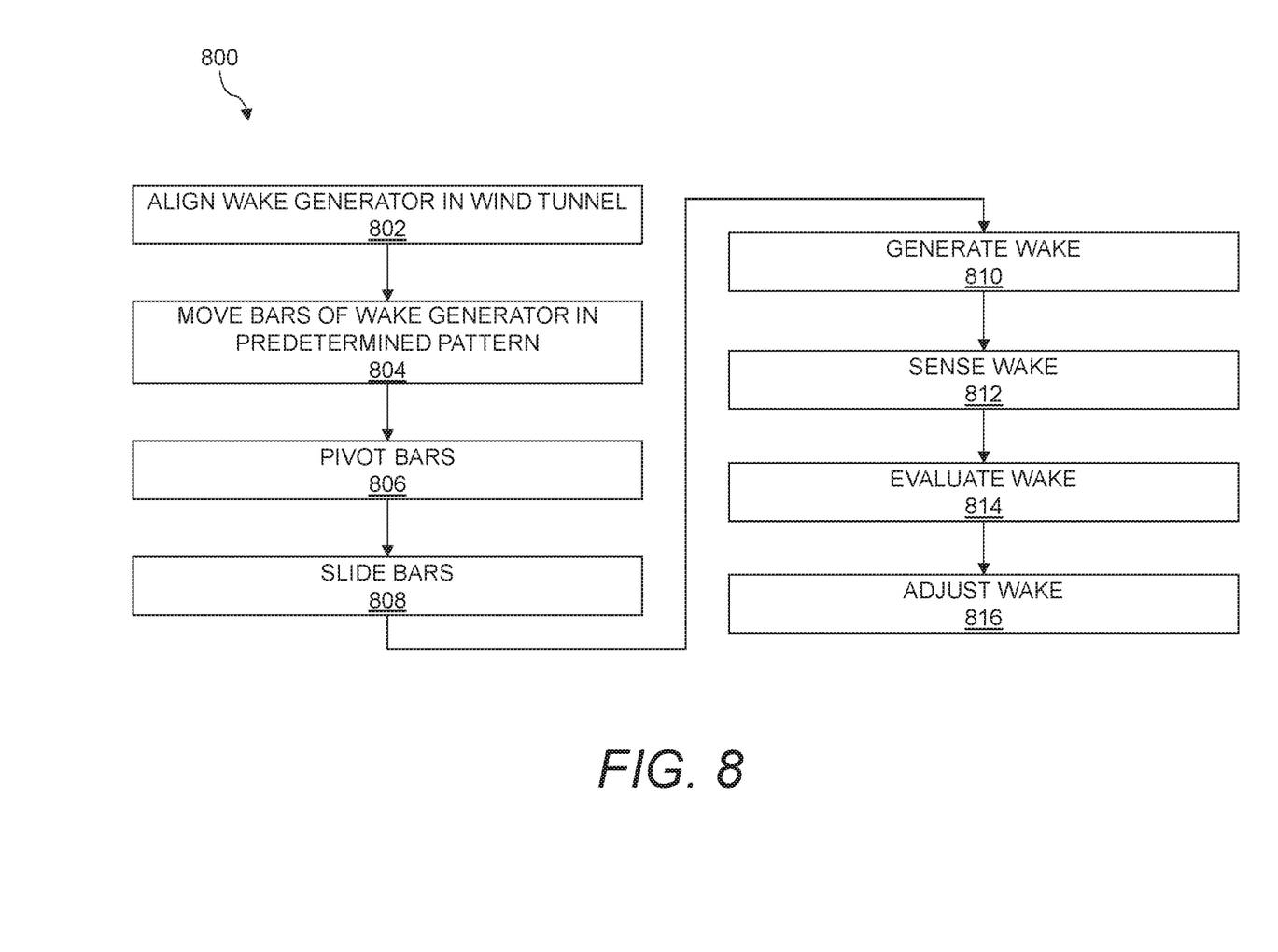
FIG. 8 is a flow chart of a method for testing the effects of fluid on a test object, in accordance with a representative embodiment.

FIG. 8 is a flow chart of a method for testing the effects of fluid on a test object, in accordance with a representative embodiment. The method 800 may be performed using any of the wake generators described herein, or other systems and devices described herein, e.g., in a wind tunnel.

As shown in block 802, the method 800 may include aligning a wake generator in a wind tunnel between a wind source and a test object, with a first side of the wake generator facing the wind source and a second side of the wake generator facing the test object. As discussed herein, the wake generator may include a first frame member having a first track formed thereon, where the first track has a shape including a first side that is substantially rounded and a second side that is substantially flat. The wake generator may also include a mounting plate disposed within a perimeter of the first track, where the mounting plate is rotatable relative to the first frame member about a first axis. The wake generator may further include a plurality of bars slidably engaged to the mounting plate and structurally configured to traverse along the first track when the mounting plate is rotated about the first axis, where each of the plurality of bars includes a pivotal connection allowing each of the plurality of bars to pivot about the pivotal connection when traversing along the first track.

As shown in block 804, the method 800 may include moving a plurality of bars of the wake generator in a predetermined pattern. This may include rotating the mounting plate to move the plurality of bars in the predetermined pattern.

The predetermined pattern may be selected to mitigate a reverse wake created by the plurality of bars at the first side of the wake generator and to generate a predetermined wake by the plurality of bars at the second side of the wake generator. The predetermined pattern may be provided by (i.e., defined by) a first track formed on a first frame member of the wake generator, where a rotatable mounting plate is disposed within a perimeter of the first track, and where each of the plurality of bars is slidably engaged to the mounting plate for traversing along the first track when the mounting plate is rotated, all as discussed above.

As shown in block 806, the method 800 may include pivoting each of the plurality of bars while moving in the predetermined pattern. Pivoting each of the plurality of bars may include aligning each of the plurality of bars (and a face thereof) substantially parallel to a substantially flat shape of the predetermined pattern when disposed along the second side, and aligning each of the plurality of bars (and a face thereof) at an angle relative to the substantially flat shape when disposed along the first side.

As shown in block 808, the method 800 may include sliding the plurality of bars relative to a first axis when moving in the predetermined pattern.

As shown in block 810, the method 800 may include generating the predetermined wake through the moving and the pivoting of the plurality of bars.

As shown in block 812, the method 800 may include sensing a wake formed by the wake generator in the wind tunnel, e.g., using a sensor as described herein.

As shown in block 814, the method 800 may include evaluating the wake, e.g., comparing the sensed wake to a predetermined or otherwise desired wake. This may be performed by a controller having a processor such as any of those described herein.

As shown in block 816, the method 800 may include adjusting the wake based on the evaluation (e.g., comparison). This may also or instead include adjusting the predetermined or preset wake. Adjusting the wake may include one or more of altering a dimension of a mounting plate to which each of the plurality of bars is engaged (e.g., changing the mounting plate or re-aligning the bars engagement with the mounting plate), increasing or decreasing a number of the plurality of bars present in the wake generator, altering a speed of the plurality of bars moving in the predetermined pattern, altering a pivoting of the plurality of bars, and so on.

Wake generators described herein may be made from a combination of commercial parts and in-house machined components. For example, some components may be machined using a Computer Numerical Controlled (CNC) milling machine. By way of example, the first frame member may be made using a CNC machine for placing channels therein for cooperation with the orientation pins, and for the precise positioning thereof for orienting the bars with their faces parallel or perpendicular with the fluid flow in a wind tunnel as described above. Components may also or instead be machined with a waterjet and mill, or the like.

As described above, the present teachings may be used to allow wake-producing objects (e.g., bars) to transition from a position where a flat face thereon is perpendicular to the fluid flow in a wind tunnel to a position where the flat face is parallel with the flow in a wind tunnel, all during a single rotation. It will also be understood that the wake half width and turbulence intensity can be adjusted by changing one or more of the width of the flat face of the bars, the number of bars, the speed of rotation, the pivoting of the bars, the shape of the bars, and so on.

The transition of the wake-producing objects (e.g., bars) from perpendicular to parallel as described above can also or instead be accomplished with the integration of one or more additional motors. Also, the geometry of the first track and the second track can be changed, e.g., while keeping smooth surface transitions for the bars to traverse along. One or more of the pivotal connection, the orientation pins, and the bearings may be replaced or supplemented with another smooth surface that allows for rotation of the bars.

It will be understood that the various wake generators described herein may include different configurations than those shown or described in detail above without departing from the scope of this disclosure. For example, the components generally shown on top portions of the device may also or instead be located on bottom portions of the device, such as the first track, the mounting plate, the motor, the pivotal connection, the sliders, the carriages, the brackets, the orientation pins, the channel, and so on. Also, or instead, although the first side of the shape of the first track is generally described as being upstream from the second side within a wind tunnel, other configurations are possible for creating different wakes. Also, pivoting of the wake-producing objects may be configured in a different manner than the specific examples described for creating different wakes. One skilled in the art will recognize that many different wakes can be created using different configurations or shapes of the components described in this disclosure, and all are intended to be included within the scope of this disclosure.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for generating a wake in a wind tunnel, comprising: aligning a wake generator in a wind tunnel between a wind source and a test object, with a first side of the wake generator facing the wind source and a second side of the wake generator facing the test object; moving a plurality of bars of the wake generator in a first track defining a predetermined pattern, the predetermined pattern selected to mitigate a reverse wake created by the plurality of bars at the first side of the wake generator and to generate a predetermined wake by the plurality of bars at the second side of the wake generator, wherein the first track on the first side of the wake generator is circular and the second side of the first track is flat; and pivoting each of the plurality of bars while moving in the predetermined pattern, wherein the plurality of bars are parallel to the first track on the second side of the wake generator.

2. The method of claim 1, further comprising generating the predetermined wake through the moving and the pivoting of the plurality of bars.

3. The method of claim 1, further comprising adjusting the predetermined wake.

4. The method of claim 3, where adjusting the predetermined wake comprises altering a speed of the plurality of bars moving in the predetermined pattern.

5. The method of claim 1, further comprising sliding the plurality of bars relative to a first axis when moving in the predetermined pattern.

6. The method of claim 1, further comprising:
sensing a wake formed by the wake generator in the wind tunnel;
comparing the wake to the predetermined wake; and
adjusting the wake based on the comparison.

* * * * *